May 20, 1930.  J. SACHS  1,758,981
ELECTRIC METER SERVICE INSTALLATION
Filed May 10, 1927   5 Sheets-Sheet 2
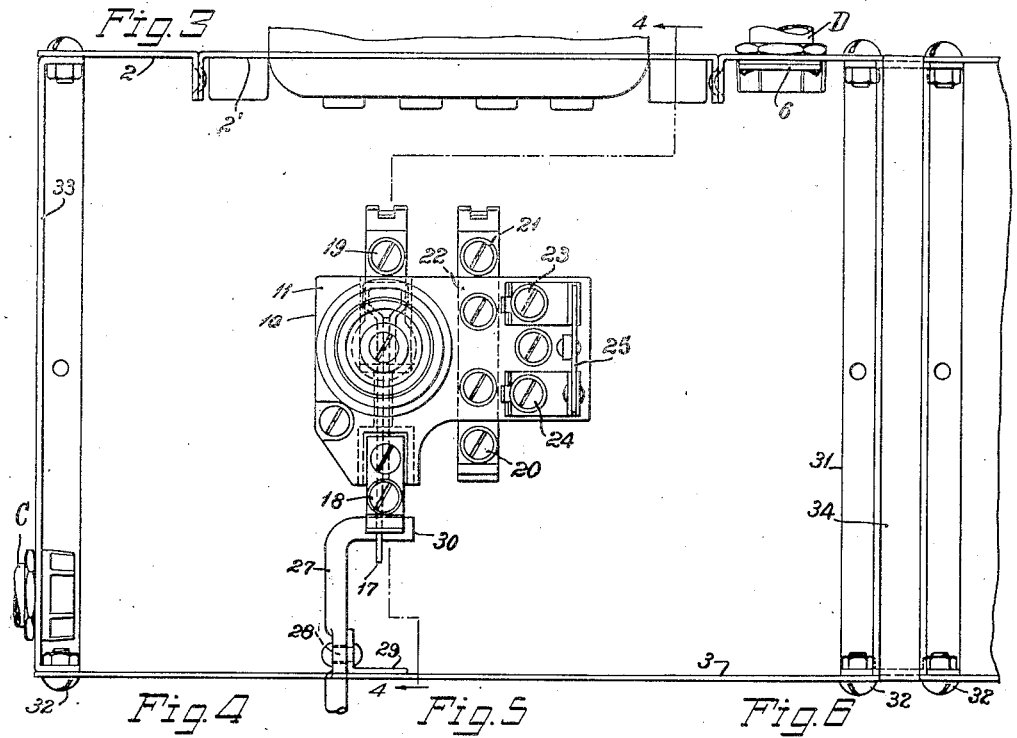
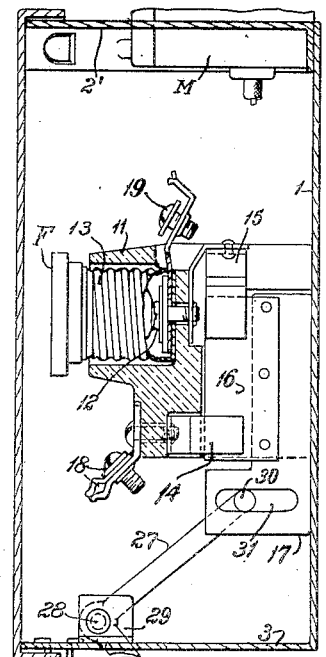
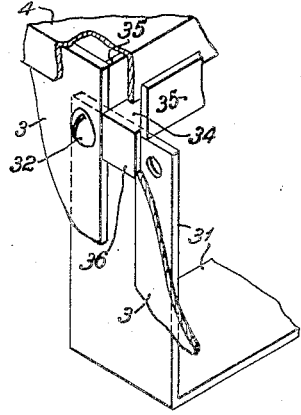
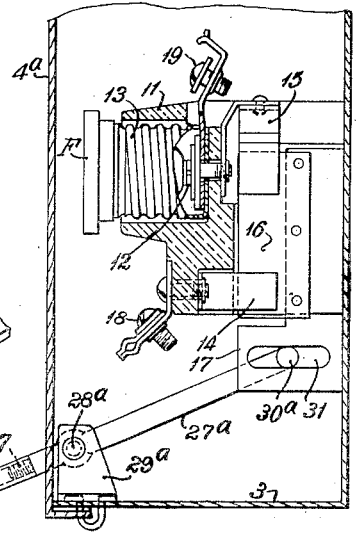
Inventor
Joseph Sachs
By S. Jay Teller
Attorney May 20, 1930.                J. SACHS                1,758,981
              ELECTRIC METER SERVICE INSTALLATION
                    Filed May 10, 1927         5 Sheets-Sheet 3
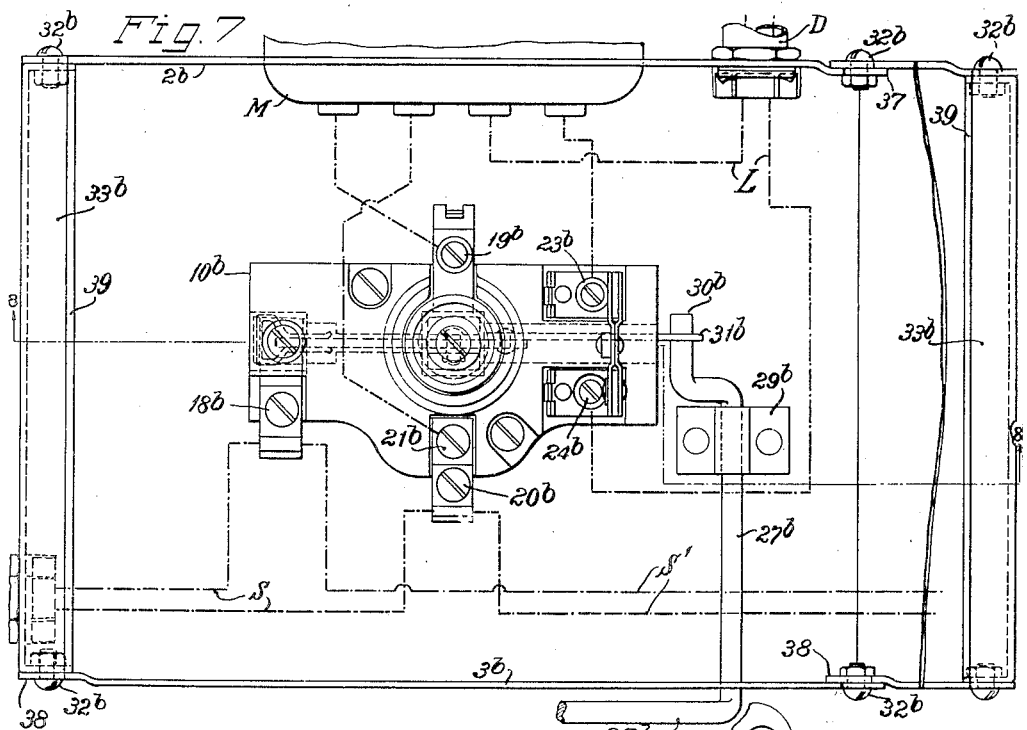
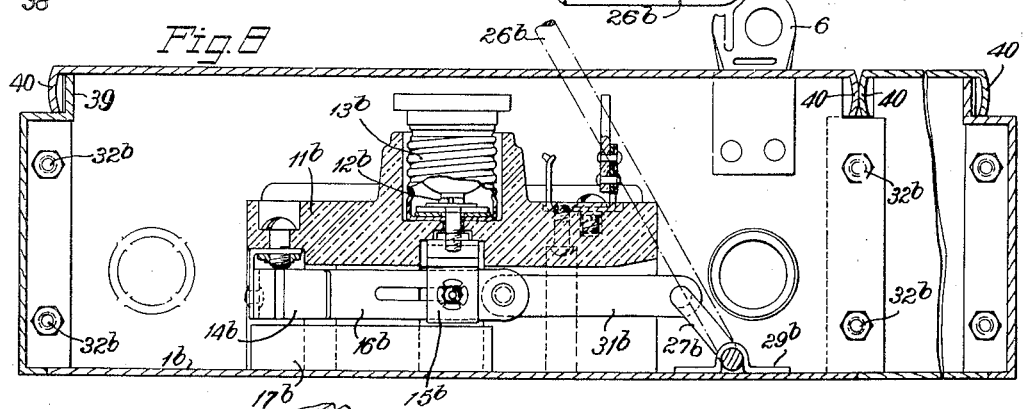
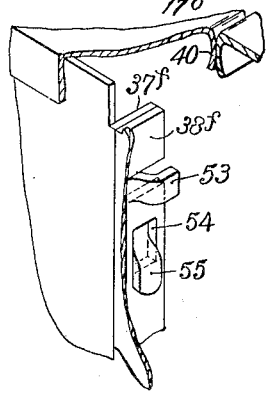
Inventor
Joseph Sachs
By S. Jay Teller
Attorney

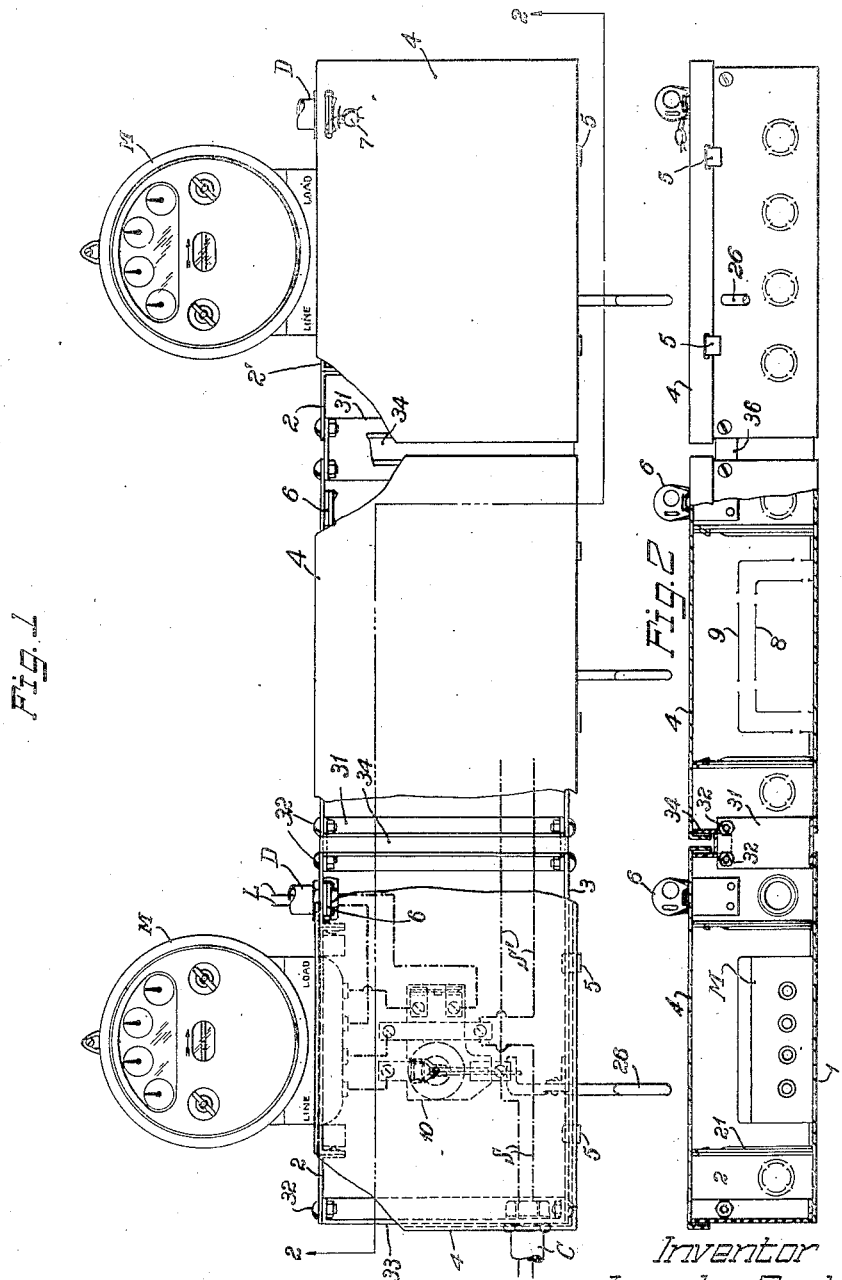

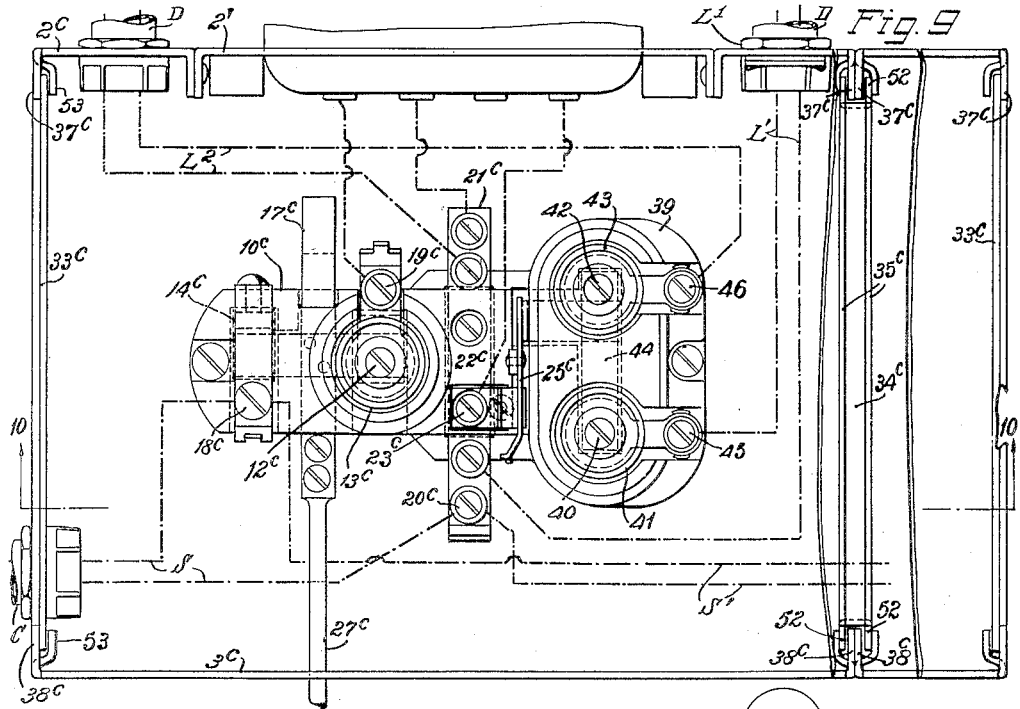

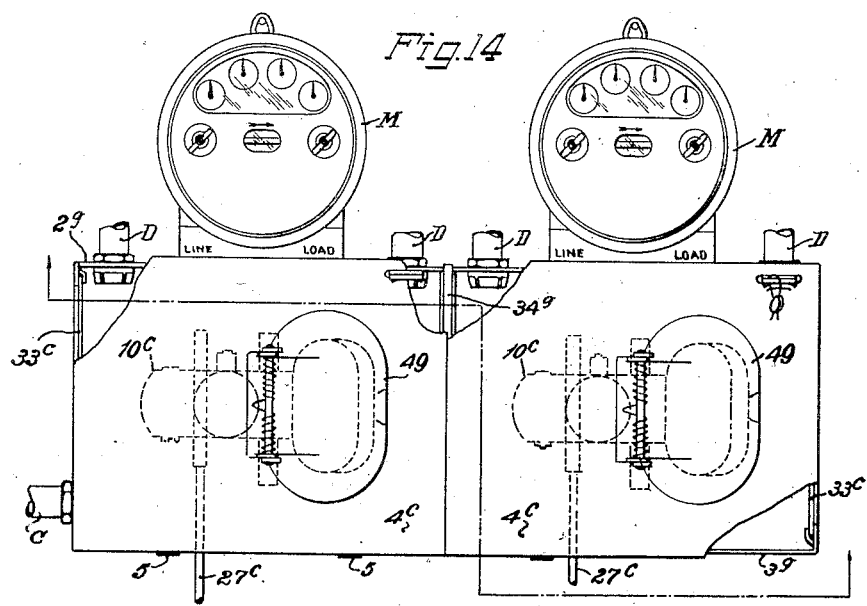
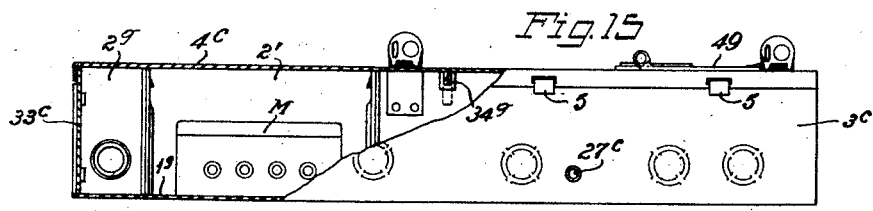
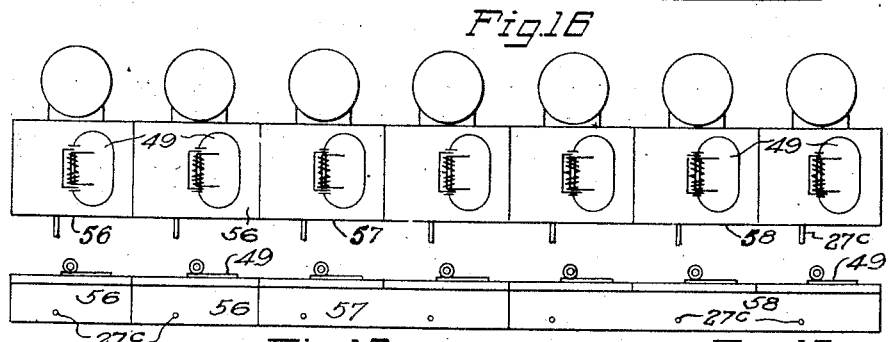
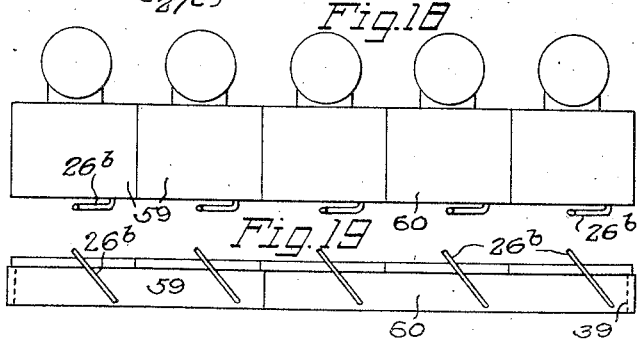

Patented May 20, 1930

1,758,981

UNITED STATES PATENT OFFICE

JOSEPH SACHS, OF WEST HARTFORD, CONNECTICUT

ELECTRIC-METER SERVICE INSTALLATION

Application filed May 10, 1927. Serial No. 190,287.

The invention relates to an enclosing system adapted primarily for use with electric meters and with the connection or circuit controlling appliances associated with such meters. The customary practice is to provide a separate enclosing cabinet for each circuit controlling appliance, the said cabinet ordinarily having one wall thereof, usually the top wall, adapted for protective association with the meter which is to be connected with the enclosed circuit controlling appliance. When several cabinets with their enclosed circuit controlling appliances and with the corresponding meters are to be arranged in a horizontal bank or series the practice is to mount the cabinets in spaced relationship and to provide conduits or troughways extending between the adjacent cabinets for enclosing the connecting wires which extend horizontally throughout the series. These connecting troughs have in some cases been formed as independent units adapted to be detachably connected with the troughs and in other cases they have been formed integrally with the cabinets; but in all cases the troughs, whether formed separately from or integrally with the cabinets, have been relatively small in cross sectionl area as compared with the cross sectional area of the cabinets themselves and the cabinets proper have been definitely separated from each other except as connected by the relatively small troughs.

One of the objects of the present invention is to provide a cabinet which is so constructed as to be adapted to form one of a continuous horizontal series of similar cabinets connected in substantially direct side-by-side engagement or juxtaposition with each other at their outer edges, no opening being left between adjacent cabinets and the several connected cabinets constituting in effect a continuous enclosure or trough having substantially the same cross sectional area throughout. Preferably in accordance with the invention the circuit controlling appliance within the cabinet is provided with an operating handle on the exterior of the cabinet and so located as not to interfere with the substantially direct side-by-side engagement or juxtaposition of one cabinet with another as described.

A further object of the invention is to provide a cabinet such as last above described initially having the sides thereof open and substantially unobstructed so that when two or more cabinets are connected together in a series as described they will form a continuous interior chamber substantially unobstructed throughout the length of the series and conforming substantially to the cross sectional area of the cabinets.

A further object of the invention is to provide a multiple unit enclosure or trough or a multiple unit installation wherein there is provided a horizontally extending enclosure adapted for protective association with a horizontal series of meters and containing or adapted to contain a horizontal series of electric circuit controlling appliances associated with the respective meters. As concerns this phase of the invention I do not limit myself as to the particular construction of the horizontally extending enclosure or trough, it being optional whether this enclosure or trough be formed from two or more separate units connected together or formed as a single integral device.

A still further object of the invention is to provide an installation such as last above described wherein the enclosure or trough or at least a part thereof is formed as a single integral device enclosing or adapted to enclose a plurality of circuit controlling appliances arranged in a horizontal series.

A still further object of the invention is to provide improved connecting means between two or more cabinets or troughs.

Still further objects of the invention will be apparent from the following specification and claims.

In the accompanying drawings I have shown several embodiments of the invention in order to clearly illustrate the scope of the invention. It will be understood, however, that the drawings are intended for illustrative purposes only and that they are not to be construed as defining or limiting the scope of the invention, the claims forming a part of this specification being relied upon for that purpose.

Of the drawings:

Figure 1 is a front view of a meter service installation embodying the invention, certain parts being broken away in order to more clearly show other parts.

Fig. 2 is a combined sectional and bottom elevational view taken along the line 2—2 of Fig. 1.

Fig. 3 is a detail view on an enlarged scale of one of the cabinets illustrated in Fig. 1, the front cover of the cabinet being omitted.

Fig. 4 is a transverse sectional view taken along the line 4—4 of Fig. 3, this view also showing the cabinet cover in place.

Fig. 5 is a fragmentary perspective view showing the connecting means between the two cabinets.

Fig. 6 is a fragmentary view similar to Fig. 4 but showing an alternate form of operating means.

Fig. 7 is a view similar to Fig. 3 but showing an alternate embodiment of the invention.

Fig. 8 is a longitudinal sectional view taken along the line 8—8 of Fig. 7.

Fig. 9 is a view similar to Figs. 3 and 7 but showing another alternate embodiment of the invention.

Fig. 10 is a longitudinal sectional view taken along the line 10—10 of Fig. 9, the enclosed appliance being shown in elevation.

Fig. 11 is a fragmentary perspective view showing the connecting means between the two cabinets as illustrated in Figs. 9 and 10.

Fig. 12 is a view similar to Fig. 11 but showing an alternate detail.

Fig. 13 is a view similar to Figs. 11 and 12 but showing an alternate means for connecting two cabinets.

Fig. 14 is a view on the same scale as Fig. 1 showing a multiple cabinet or trough.

Fig. 15 is a combined sectional and bottom elevational view taken along the line 15—15 of Fig. 14.

Figs. 16 and 17 are diagrammatic front and bottom views on a reduced scale showing one combination including multiple troughs.

Figs. 18 and 19 are views similar respectively to Figs. 16 and 17 and showing another combination including multiple troughs.

In accordance with one phase of the invention I provide an enclosing cabinet having back, top and bottom walls and adapted to be mounted in substantially direct side-by-side engagement or juxtaposition with another similar cabinet to form a horizontally extending trough. The cabinet is further provided with an openable front cover connected with the body portion thereof, and adapted to be opened and closed independently of the cover of any connected cabinet. In Figs. 1 and 2 I have shown three such cabinets so mounted and connected and in Figs. 3 to 5 I have shown the details of construction of one of the cabinets and of the means for connecting two cabinets together.

The body portion of each cabinet comprises a back wall 1 and top and bottom walls 2 and 3. These walls may be provided with any desired arrangement of knockouts, as indicated. It will be observed that the body portion throughout at least a part of the distance between the bottom wall 3 and the top wall 2 is entirely open from front to rear and from side to side. This enables the said body portion to serve in conjunction with other similar body portions as an open-front wire receiving trough. The openable front cover of the cabinet is shown at 4, this being hinged at 5, 5 to the bottom wall 3. The cover can be held in closed position by means of a latch 6 and if desired the cover can be sealed by means of a suitable seal 7 inserted through the latch.

Either the top wall or the bottom wall, ordinarily the former, of the cabinet, is provided with means for the protective association of an electric meter such as M. To this end the top wall 2 may be formed with a separate removable section 2' which fits an opening in the top wall proper as shown in Figs. 1 to 4, or the said top wall 2 may be formed integrally without the said separable section 2'. The means which serve for the protective association of the meter with the cabinet are carried by or formed in the separable section 2' when such section is provided, but when this separable section is not provided the said means are carried by or formed in the main body of the top wall 2. I do not narrowly limit myself as concerns the exact details of construction which adapt the top wall for such protective association with a meter. The top wall may be formed with a simple opening therein adapted to receive the terminal portion of a meter, or it may be provided with a movable shutter or shutters for varying the effective size of an opening therein so as to accommodate any one of two or more meters of different sizes or styles as disclosed in my copending applications for electric meter protecting cabinet, Serial No. 532,449 filed Jan. 28, 1922, for meter adapter, Ser. No. 49,896 filed Aug. 13, 1925, and for meter protecting cabinet, Ser. No. 159,584 filed Jan. 7, 1927; or it may be provided with one or more removable knockouts therein so that any one of them can be removed to provide the required meter opening as set forth in my application for box for enclosing electrical appurtenances, Ser. No. 578,342, filed July 29, 1922. It will be understood that in so far as the present invention is concerned, it is primarily essential, as already stated, that the top wall 2 be constructed for protective association with an electric meter and that the exact details whereby this result is obtained are of secondary importance. However, I prefer and have shown the removable section 2' of the top wall 2 provided with knockouts therein as set forth in my aforesaid application Ser. No. 578,342. As shown most clearly in Fig. 2 there are provided two knockouts 8 and 9, these knockouts when in place serving in cooperation with the other parts of the top wall to entirely close the upper end of the cabinet. It will be understood that the knockout 8 can be removed to adapt the end wall for protective association with a meter of one size or that the knockout 9 can be removed to adapt the cabinet for protective association with a meter of another size.

The cabinet is adapted not only for the protective association with an electric meter as described, but it is also adapted for enclosing a meter service circuit controlling appliance such as 10 shown in the left hand cabinet in Fig. 1. It will be understood that similar appliances are or may be mounted in the other cabinets. The enclosed appliance does not of itself constitute a part of the present invention and the specific appliance shown has been selected merely for purposes of illustration. This appliance is similar to that disclosed in my patent for electric circuit controlling appliance, No. 1,754,441 issued April 15, 1930. The appliance 10 comprises an insulating base 11 which carries contacts 12 and 13 for a fuse F. A plug fuse is shown but I do not so limit myself. The base also carries stationary switch contacts 14 and 15, the latter switch contact being electrically connected with the fuse contact 12. A sliding switching member 16 is provided for making and breaking the connection between the two stationary contacts 14 and 15, this sliding switching member including an insulating element 17 which extends to the back of the cabinet so as to be guided in part by the back wall thereof. Wire connecting terminals 18 and 19 are connected respectively with the switch contact 14 and the fuse contact 13 and other wire connecting terminals 20 and 21 are connected with a neutral conductor 22. In addition there are wire terminals 23 and 24 with a testing switch 25 connected between them. As shown in Fig. 1, the main service or bus wires S are connected respectively with the terminals 18 and 20. The meter connections at the service side thereof extend from the terminals 19 and 21. At the load side the meter is connected with one of the load wires L through the test switch 25 and the terminals 23 and 24 and it is directly connected with the other load wire L.

Preferably there is provided for the circuit opening and controlling appliance a manually operable handle on the exterior of the cabinet which makes it possible for the switching member to be moved when the cabinet is closed and sealed. The details of construction and mounting of the handle may be widely varied but it will be obvious that the handle must be located otherwise than at the side of the cabinet, inasmuch as the cabinet is constructed to be directly associated at its side with another similar cabinet as already stated. In Figs. 1, 3, and 4 I have shown a handle 26 which projects through an opening in the bottom wall 3 of the cabinet. This handle is formed integrally with a lever 27 which is pivoted at 28 to a bracket carried by the bottom wall 3. The lever 27 carries an offset portion 30 which extends into a slot 31 formed in the insulating element 17 of the slidable switching member. From an inspection of the drawings it will be obvious that by moving the handle 26 forward the sliding member can be moved downward to open the circuit and that by moving the handle 26 rearward the switching member can be moved upward to re-establish the circuit.

In accordance with the invention the cabinet as described is constructed and adapted to be closely connected in substantially direct side-by-side engagement or juxtaposition at the outer edges with another similar cabinet, without the interposition of any connecting trough whether formed integrally with the cabinet proper or separately therefrom. The sides of the cabinet are preferably initially open and the construction is therefore such that when two or more cabinets are thus mounted or connected they in effect form an unbroken enclosure or trough of substantially uniform cross sectional area extending from one end to the other of the series of such cabinets. The cover for each cabinet is so connected and positioned as to be adapted to be opened and closed independent of the cover for any other cabinet of the series.

The details of construction whereby two or more cabinets can be thus associated or connected can be widely varied and several such connecting means will be hereinafter described in detail. In Figs. 1 to 5 I have shown a separate coupling member 31 which serves to connect two cabinets together. This member is U-shaped and fits within the side portions of the two cabinets, being suitably held in place as, for instance, by means of bolts 32, 32. With a series of cabinets as illustrated it is obvious that the cabinets at the ends of the series must have their outer sides closed in order to properly protect the enclosed appliances. For this purpose I have shown the end cabinets of the series as provided with removable side walls 33 held in place by bolts 32 which may be the same as the bolts 32 already referred to. It will be understood that the locations of the holes for the bolts 32 in the cabinet proper and also in the coupling member 21 and in the side wall 33 are such that either a coupling member or a side wall may be connected at either end of the cabinet depending upon whether the said side is to be closed or is to be connected with another similar cabinet. The described construction also makes possible the the closing of both sides of a cabinet to adapt it for use by itself if desired.

As shown in Figs. 1 and 2 the covers of two adjacent cabinets have a space between them. In order that there may be no loss of protection by reason of this space I have shown a detachable channel 34 extending across the sides of the two adjacent boxes. The channel 34, being detachable, does not interfere with the use of the body portions of the boxes as an open-front trough or wireway. This channel has forward turned flanges 35, 35 as shown in Fig. 5, the rearward turned flanges of the two adjacent covers extending between these two flanges of the channel member. In order that the channel member 34 may be conveniently held in place it is provided at its ends with rearward turned lips 36, 36 which lie respectively between the adjacent top and bottom walls of the two cabinets and engage the outer surfaces of the U-shaped coupling member 31 as clearly shown in Fig. 5.

The before mentioned trough may be formed by connecting together two or more separate cabinets, as already described and as shown in Figs. 1 and 2, or it may be initially formed as a single integral device if preferred. This trough, whether formed of separate units or integrally, is provided at intervals throughout its length with means for the protective association therewith of a horizontal series of electric meters, these meter protective means having been already fully described. The trough is further adapted for enclosing a horizontal series of electric meter service appliances such as 10, and the trough serves for enclosing main service or bus wires extending horizontally from one appliance to another as shown at S' in Fig. 1. The service wires S may be led into the trough at one end through a conduit C connected with the corresponding side wall 33 at a knockout opening therein, and the load wires L may be led out of the trough at intervals through conduits D, D connected with either the top wall or the bottom wall at knockout openings therein. Associated with the respective appliances are manually operable handles on the exterior of the trough, these handles being horizontally spaced in accordance with the spacing of the appliances.

As is well known, circuit controlling appliances with their enclosures and the necessary wiring connections are commonly installed by the electrical contractor prior to the installation of the meters. With cabinets or troughs constructed in accordance with my invention the contractor can install a horizontal series of cabinets constituting a horizontal trough as illustrated, leaving the knockouts 8 and 9 in place and thus entirely protecting the enclosed parts until such time as the meters are to be installed and the meter connections made. Figs. 1 and 2 show the installation with two meters connected but with the intermediate cabinet having its knockouts 8 and 9 still in place, thus protecting the enclosed parts until such time as a meter is to be installed and load circuit connections made.

In Fig. 6 I have shown a circuit controlling appliance which is the same as that shown in the other figures but which is provided with a somewhat different operating means. As shown in this figure there is provided a lever 27$^a$ having an offset portion 30$^a$ which engages the slot 31 in the insulating element 17. The lever 27$^a$ is pivoted at 28$^a$ on a bracket 29$^a$ and the end of the lever extends through a slot in the cover 4$^a$ of the cabinet. As illustrated the end of the lever 27$^a$ is threaded at 37, the handle 26$^a$ being screwed onto the threaded end 37 of the lever. It will be understood that when the cover is to be opened the handle 26$^a$ is first unscrewed.

In Figs. 7 and 8 I have shown an alternate embodiment of the invention differing in several details from that shown in Figs. 1 to 5. The body portion of the cabinet comprises a back wall 1$^b$ and top and bottom walls 2$^b$ and 3$^b$. The cover of the cabinet is shown at 4$^b$, this cover being hinged similarly to the cover 4 shown in Figs. 1 to 5. The top wall 2$^b$ of the cabinet is integral, no separable sections such as 2' being provided. The construction is or may be otherwise similar to that shown in Figs. 1 to 4, one or more removable knockouts being provided so that one of them can be removed to provide an opening for the reception of the terminal chamber portion of an electric meter M.

I have shown an appliance 10$^b$ in the cabinet which differs from the appliance 10 already described, this appliance 10$^b$ being similar to that disclosed in my patent for electric circuit controlling appliance No. 1,754,440 issued April 15, 1930. The appliance comprises an insulating base 11$^b$ which carries contacts 12$^b$ and 13$^b$ for a fuse F. The base also carries stationary switch contacts 14$^b$ and 15$^b$ the latter switch contact being electrically connected with the fuse contact 12$^b$. A sliding switching member 16$^b$ is provided for making and breaking the connection between the two stationary contacts 14$^b$ and 15$^b$. This sliding switch member is located in a slot or recess in the back of the base and an insulating element 17$^b$ is provided which is located in the slot and which serves to guide the movement of the switching member. Wire connecting terminals 18$^b$ and 19$^b$ are connected respectively with the switch contact 14$^b$ and the fuse contact 13$^b$ and other wire connecting terminals 20$^b$ and 21$^b$ are provided. In addition there are wire terminals 23$^b$ and 24$^b$ with a testing switch 25$^b$ connected between them. As shown in Fig. 7 the main service and bus wires S and S' are connected respectively with the terminals 18$^b$ and 20$^b$. The meter connections at the service side thereof extend from the terminals 19$^b$ and 21$^b$. At the load side the meter is connected with one of the load wires L through the test switch 25$^b$ and the terminals 23$^b$ and 24$^b$ and it is directly connected with the other load wire L. I have shown an operating means for the circuit controlling appliance which is of the type disclosed in my aforesaid Patent No. 1,754,441. As illustrated there is a spindle 27$^b$ which extends through an opening in the bottom wall 3$^b$ of the cabinet, this spindle terminating in a handle 26$^b$ located on the exterior of the cabinet and below the said bottom wall 3$^b$. The spindle 27$^b$ is pivotally mounted having one bearing at the opening in the bottom wall 3$^b$ and having another bearing formed by a clip 29$^b$ secured to the back wall 1$^b$ of the cabinet. The spindle is provided with an offset crank portion 30$^b$ which is connected with the switching member by means of a link 31$^b$ formed of insulating material. It will be obvious that when the handle 26$^b$ is moved toward the right the switching member 16$^b$ will be moved to disengage the switch contact 14$^b$ and thus break the circuit. When the handle is moved toward the left the switching member 16$^b$ is re-engaged with the contact 14$^b$ and the circuit is re-established.

The means for connecting two cabinets together instead of comprising a separate coupling member as shown in Figs. 1 to 5 comprises extensions formed on the cabinet walls and adapted to directly engage each other. This direct engagement may be effected in different ways but in Figs. 7 and 8 I have shown the parts constructed for direct overlapping or telescopic engagement. As shown the top wall 2$^b$ of each cabinet is offset downward at one end as indicated at 37 and the bottom wall 3$^b$ is offset upward at the opposite end as indicated at 38. The end portions of the top and bottom walls are extended longitudinally as indicated so that each of the said offset portions 37 and 38 of two adjoining boxes overlaps with the corresponding straight wall of the other box. As shown the back walls of the boxes are arranged to butt against each other without any overlapping but as to this there may be variations. The two boxes may be held in the engaged position as shown in Figs. 7 and 8 in any suitable way and I have shown bolts 32$^b$, 32$^b$ for this purpose, these bolts extending through suitable holes in the overlapped portions of the box walls.

In order that the cabinets at the ends of the series may have their outer sides closed I have shown removable side walls 33$^b$, 33$^b$. It will be observed that these side walls have inward turned flanges with holes therein adapted to receive other bolts 32$^b$, 32$^b$. Preferably each side wall is provided with an inward offset portion 39 which is positioned to fit within the adjacent flange of the cover 4$^b$ as clearly shown.

Instead of providing a channel member for sealing the joint between two adjacent covers I have shown the covers themselves as adapted to directly engage each other. As shown the two adjacent inward extending flanges of the cover are made convex as shown at 40, 40, these convex flanges being constructed to directly engage each other.

In Figs. 9 to 11 I have shown another alternate embodiment of the invention differing in various details from those already shown and described. The body portion of the cabinet comprises a back wall 1$^c$ and top and bottom walls 2$^c$ and 3$^c$. The cover of the cabinet is shown at 4$^c$ this cover being hinged similarly to the cover 4 shown in Figs. 1 to 5. The top wall 2$^c$ is provided with a removable section 2' adapted for protective association with a meter as already fully set forth in connection with Figs. 1 to 5.

I have shown an appliance 10$^c$ which differs from the appliances already described, this appliance 10$^c$ being similar to that disclosed in my patent for electric circuit controlling appliance No. 1,754,442, issued April 15, 1930. The appliance comprises an insulating base 11$^c$ which carries contacts 12$^c$ and 13$^c$ for a fuse F. The base also carries stationary switch contacts 14$^c$ and 15$^c$ the latter switch contact being electrically connected with the fuse contact 12$^c$. A movable switching element 16$^c$ is provided for making and breaking the connection between the two stationary contacts 14$^c$ and 15$^c$. This movable switching element is located in a recess in the back of the base and an insulating element 17$^c$ is provided for carrying and actuating the said element 16$^c$. Wire connecting terminals 18$^c$ and 19$^c$ are connected respectively with the switch contact 14$^c$ and the fuse contact 13$^c$ and other wire connecting terminals 20$^c$ and 21$^c$ are connected with a neutral conductor 22$^c$. In addition there is a wire terminal 23$^c$ connecting with a testing switch 25$^c$.

The fuse and switch parts thus far described, constituting a circuit controlling appliance, are positioned to be entirely enclosed within the cabinet and to be inaccessible from the exterior of the cabinet when the cover 4$^c$ is closed. In addition to the said circuit controlling appliance as described, which is connectible on the service side of a meter, I may also provide contacts for the reception of one or more branch circuit fuses connectible on the load side of the meter. These load side fuse contacts may be mounted on an extension of the base 11$^c$ which carries the service side circuit controlling appliance or they may be otherwise mounted. I have shown the base 11$^c$ as provided with an integral extension 39 on which are mounted two pairs of fuse contacts 40, 41 and 42, 43 adapted for receiving plug fuses such as F¹. While I have shown two load side fuses it will be understood that any desired number may be provided. A suitable conducting means such as 44 is provided for connecting the contacts 40 and 42 with the test switch 25ᶜ. Wire terminals 45 and 46 are provided which are connected respectively with the fuse contacts 41 and 43.

As shown in Fig. 9 the main service and bus wires S and S' are connected respectively with the terminals 18ᶜ and 20ᶜ. The meter connections at the service side thereof extend from the terminals 19ᶜ and 21ᶜ. At the load side of the meter there is a connection extending to the terminal 23ᶜ which, as already described, is connected with the contacts 40 and 42 for the load side fuses. One of the load wires L¹ is connected with the terminal 45 and the other load wire L¹ is connected with the neutral conductor 22ᶜ. One of the load wires L² is connected with the wire terminal 46 and the other load wire L² is connected with the neutral conductor 22ᶜ.

Preferably the cabinet is so constructed that access may be had to the load side fuses F¹ while the cover 4ᶜ of the cabinet is closed and sealed. For this purpose the cover 4ᶜ is provided with an opening 47 through which the said load side contacts and fuses are accessible. A portion of the extension 39 of the base lies immediately adjacent the cover at the said opening so as to substantially close the opening and prevent access thereto to any interior parts other than the said load side fuse contacts and fuses. As illustrated, the opening 47 is formed in a depressed portion 48 of the cover, this depressed portion forming a chamber in which the outer portions of the fuses F¹ are located. In order to normally close the said chamber there is provided an auxiliary cover 49 which is pivoted to the main cover at 50 and which is normally held closed by means of a spring 51. It will be understood that the auxiliary cover 49 can be opened by the customer at any time to give access to the load side fuses. The arrangement of inaccessible service side fuses and accessible load side fuses together with other parts as described does not of itself constitute a part of the present invention, this being presented in my copending applications for protected electric meter service appurtenances Ser. No. 579,178 filed Aug. 2nd, 1922, Ser. No. 693,010 filed Feb. 15, 1924, and Ser. No. 176,270 filed March 17, 1927.

Any suitable means may be used for operating the switching member of the circuit controlling appliance but I have shown for this purpose an operating member which differs from those already described. A rod 27ᶜ is provided which is rigidly connected with the insulating element 17ᶜ of the switching member and which extends vertically downward through an opening in the bottom wall 3ᶜ of the cabinet. This rod 27ᶜ terminates in a suitable handle which is not shown. It will be seen that the switching member may be actuated to open and close the circuit by simply moving the handle and the rod 27ᶜ vertically.

The means shown in Figs. 9 and 10 for connecting two cabinets together differs from the means for this purpose shown in the other figures. As illustrated each cabinet is provided at each side with flanges 37ᶜ and 38ᶜ, these flanges extending downward and upward respectively from the top and bottom walls 2ᶜ and 3ᶜ. The flanges 37ᶜ and 38ᶜ of adjacent boxes are adapted to directly engage each other as shown. The bottom walls 1ᶜ of the cabinets are adapted to abut against each other as also shown. Provision is made for clamping the adjacent contacting flanges together and as shown in Figs. 9 to 11 this means is in the form of a U-shaped channel member 34ᶜ which extends across the front of the cabinets and rearward along the contacting upper and lower flanges on the cabinet walls. The channel member 34ᶜ is provided with upward and downward extending flanges 52, 52 which embrace the said flanges 37ᶜ, 37ᶜ and 38ᶜ, 38ᶜ thus locking the two cabinets together. The front portion of the member 34ᶜ is provided with forward extending flanges 35ᶜ, 35ᶜ which embrace the rearward extending flanges on the covers 4ᶜ, 4ᶜ to seal the joint between the covers. Thus the one channel member 34ᶜ serves not only as a coupling member for connecting the two boxes together but it also serves as a sealing member to seal the joint between the two adjacent covers.

For closing the sides of the cabinets at the ends of the series, or for closing both sides of a single cabinet which cabinet is to be used alone, I provide removable side walls 33ᶜ, 33ᶜ. As shown each of these side walls is simply a flat rectangular plate. Tongues 53, 53 are offset inward from the flanges 37ᶜ and 38ᶜ, these tongues serving to engage the inner surfaces of the side walls 33ᶜ to hold them in place. It will be understood that the said side walls are held against removal in the forward direction by means of the cover 4ᶜ.

In Fig. 12 I have shown a channel member 34ᵈ the primary purpose of which is to seal the joint between the covers without, however, being depended upon as the sole means for clamping the two boxes together. The channel 34 is provided with forward extending flanges 35ᵈ, 35ᵈ which embrace the two flanges of the covers and it is provided with rearward extending lips 36ᵈ, the purpose of which is to hold the channel in place. The lips 36ᵈ may in addition assist in holding the cabinet flanges together but for this purpose reliance is placed primarily on other clamping means such as bolts 32$^d$ extending through the flanges.

In Fig. 13 I have shown an alternate joint construction whereby I entirely avoid the use of any separate elements for connecting the two cabinets together, that is, I avoid the use of separate coupling devices such as shown in Figs. 1 to 5 and in Figs. 9 to 11, and I also avoid the use of bolts as shown in Figs. 7 and 8, and 12. The two adjoining boxes are provided with flanges 37$^f$ and 38$^f$ respectively, each of these flanges being provided with tongues 53, 53 for holding detachable side walls as already described. In addition one of the flanges, as, for instance 38$^f$, is provided with an opening 54 and the other flange 37$^f$ is provided with a tongue 55 which extends into the opening 54 and engages the inner surface of the corresponding flange 38$^e$. It will be understood that with this construction one of the cabinets, in this case the right hand cabinet as shown in Fig. 13, would be put in place first, then the next adjacent cabinet, in this case the left hand cabinet as shown in Fig. 13, would be placed, the tongue 55 being entered in the opening 54 so as to lock the two cabinets in direct engagement with each other. With this construction, if desired, the channel for sealing the joint between the two covers may be omitted, the flanges of the covers being made convex at 40 as already described in connection with Figs. 7 and 8.

As already pointed out in connection with Figs. 1 and 2, one of the purposes of the invention is to provide a horizontally extending enclosure or trough which is closed at its ends and which is provided with a plurality of independently openable front covers, this trough being adapted at intervals for the protective association therewith of electric meters and being further adapted for the enclosing of meter service appliances spaced in accordance with the meter spacing. In the various embodiments of the invention as illustrated in Figs. 1 to 13 the trough is formed or is adapted to be formed from two or more separate cabinets each adapted for association with a single meter and a single meter service appliance. In Figs. 14 and 15 I have illustrated the fact that the invention is not limited to a trough made up of two or more units but may be formed as a single integral device. The trough shown in Figs. 14 and 15 is adapted for use with two meters and two circuit controlling appliances but it will be understood that the invention is not so limited and that the trough may be adapted for use with three or more units and three or more circuit controlling appliances as desired.

The trough illustrated comprises a body portion having a back wall 1$^g$ and top and bottom walls 2$^g$ and 3$^g$. The trough is provided with a plurality (in this case two) of independently openable front covers 4$^c$, 4$^c$ these covers being hinged to the bottom wall 3$^g$ as indicated at 5, 5. The top wall 2$^g$ is provided at intervals with means for the protective association with electric meters, two such means being indicated. As illustrated the top wall is provided with a plurality of removable sections 2′, 2′, in which the meter protective means are formed, but I do not so limit myself as the integral construction shown in Figs. 7 and 8 may be used if desired.

The trough may be permanently closed at its side ends if desired, but I prefer to provide means at the ends of the trough so that the trough can, if desired, be connected with another trough or cabinet. As to the connecting means itself, I may use any of the forms which I have illustrated or any other suitable form but for purposes of illustrating the invention I have shown the form fully illustrated in Figs. 9 to 11. Repetition of the description is unnecessary. It will be noted that when the multiple unit trough is to be used by itself both side ends thereof are closed by walls 33$^c$ as already described.

The top and bottom walls of the cabinet are notched at the front to provide clearance for the flanges of the covers. For sealing the joint between two adjacent covers I may depend upon direct engagement of the covers themselves as illustrated in Fig. 8 or I may provide a channel member 34$^g$ as illustrated in Figs. 14 and 15. This channel member 34$^g$ is preferably detachable and it may be similar to the member 34 shown in Figs. 1 to 5.

The appliances to be positioned in the trough may be of any of the types already described or of any other suitable type. For purposes of illustration, however, I have indicated appliances 10$^c$ such as shown in Figs. 9 and 10. Repetition of the description of these appliances is unnecessary. Obviously when devices such as 10$^c$ are provided the covers 4$^c$ are provided with openings and with auxiliary covers 49 as already described.

In Figs. 16 to 19 I have illustrated the fact that it is possible to combine multiple units as well as single units in making an electric meter installation. Figs. 16 and 17 show two single cabinets 56, 56 which may be identical in construction with that shown in Figs. 9 to 11, one two-unit cabinet 57 which may be identical in construction with that shown in Figs. 14 and 15, and one three-unit cabinet 58 which may be identical in construction with that shown in Figs. 14 and 15 except as concerns the number of units. Figs. 18 and 19 show a two-unit cabinet 59 and a three-unit cabinet 60, and these cabinets may be understood to conform in general construction to that shown in Figs. 7 and 8.

In the several figures of the drawings and in this specification I have shown and described various details of cabinet construction in combination respectively with different means for the protective association of electric meters, with various circuit controlling devices, and with various operating mechanisms. It is to be understood, however, that I do not limit myself to the specific combinations illustrated as it will be obvious that numerous other combinations of cabinet details, meter protective means, circuit controlling appliances, and operating mechanisms can be used without departing from the spirit of the invention.

What I claim is:

1. An open-sided cabinet for an electric appliance comprising in combination, an open-sided channel-shaped body portion leaving the sides and at least a part of the front of the cabinet open and substantially unobstructed, a circuit opening and closing appliance in the cabinet means associated with the aforesaid body portion at each side of the cabinet, and serving either for the connection of a side wall for closing the corresponding open side of the cabinet or for the connection of the cabinet with another similar cabinet in side-by-side alignment therewith, each of the said means serving in conjunction with a side wall or with another cabinet to prevent access to the enclosed appliance through the corresponding initially open end of the cabinet, an openable front cover means connected with the said body portion and movable independently of the cover means of any other connected cabinet to provide access to the enclosed appliance, and a manually operable actuating handle for the said appliance located on the exterior of the cabinet and between the planes of the open sides of the said cabinet.

2. An open-sided cabinet for an electric appliance comprising in combination, an open-sided channel-shaped body portion leaving the sides and at least a part of the front of the cabinet open and substantially unobstructed, a circuit opening and closing appliance in the cabinet means associated with the aforesaid body portion at each side of the cabinet and serving either for the connection of a side wall for closing the corresponding open side of the cabinet or for the connection of the cabinet with another similar cabinet in side-by-side alignment therewith, each of the said means serving in conjunction with a side wall or with another cabinet to prevent access to the enclosed appliance through the corresponding initially open end of the cabinet, an openable front cover means connected with the said body portion and movable independently of the cover means of any other connected cabinet to provide access to the enclosed appliance, and manually operable means extending through an opening in the bottom wall of the cabinet for actuating the said appliance, the said means including a handle located below the said bottom wall and between the planes of the open sides of the cabinet.

3. An electric meter service installation comprising in combination a channel shaped trough of substantially uniform cross section throughout and open at the front from end to end to provide a continuous open-front wireway, the said trough being provided with spaced means for the protective association therewith of a horizontal series of electric meters and being adapted for enclosing a horizontal series of circuit controlling meter service appliances spaced substantially in accordance with the spacing of the said meter protective means, means for closing the trough at the side ends thereof, and openable front cover means for the trough serving when open to permit access to the trough from end to end thereof.

4. An electric meter service installation comprising in combination a channel-shaped trough of substantially uniform cross section throughout and open at the front from end to end to provide a continuous open-front wireway, the said trough being provided with spaced means for the protective association therewith of a horizontal series of electric meters and adapted for enclosing a horizontal series of meter service appliances spaced substantially in accordance with the spacing of the said meter protective means, means for closing the trough at the side ends thereof, and a plurality of independently openable front covers for the trough whereby access may be obtained to each enclosed appliance independently of the others, and whereby access may be obtained to the entire interior of the trough from end to end thereof.

5. An electric meter service installation comprising in combination a chanel-shaped trough of substantially uniform cross section throughout provided with spaced means for the protective association with the enclosure of a horizontal series of electric meters, a horizontal series of circuit opening and closing meter service appliances in the trough spaced substantially in accordance with the spacing of the said meter protective means, means for closing the trough at the ends of the series of appliances, openable front cover means for the trough whereby access may be obtained to the enclosed appliances, and a series of manually operable handles on the exterior of the trough for actuating the respective appliances, the said handles being horizontally spaced in accordance with the spacing of the appliances.

6. An electric meter service installation comprising in combination an open-sided channel-shaped integral trough of substantially uniform cross section throughout provided with spaced means for the protective association therewith of a horizontal series of electric meters and adapted for enclosing a horizontal series of circuit controlling meter service appliances spaced substantially in accordance with the spacing of the said meter protective means, means for closing the trough at the side ends thereof, and a plurality of independently openable front covers for the trough whereby access may be obtained to each enclosed appliance independently of the others.

7. An electric meter service installation comprising in combination an open-sided channel-shaped integral trough of substantially uniform cross section throughout provided with spaced means for the protective association therewith of a horizontal series of electric meters and adapted for enclosing a horizontal series of circuit controlling meter service appliances spaced substantially in accordance with the spacing of the said meter protective means, means associated with the said trough at each side end thereof and serving either for the connection of a side wall for closing the corresponding open side end of the trough or for the connection of the trough with another similar trough or cabinet in side-by-side alignment therewith, each of the said means serving in conjunction with a side wall or with another trough or cabinet to prevent access to the interior of the trough through the corresponding initially open side thereof, and a plurality of independently openable front covers for the trough whereby access may be obtained to each enclosed appliance independently of the others.

8. An electric meter service installation comprising in combination an open-sided channel-shaped integral trough of substantially uniform cross section throughout provided with spaced means for the protective association therewith of a horizontal series of electric meters, a horizontal series of circuit opening and closing meter service appliances in the trough spaced substantially in accordance with the spacing of the said meter protective means, means for closing the trough at the side ends thereof, and a series of manually operable handles on the exterior of the trough for actuating the respective appliances, the said handles being horizontally spaced in accordance with the spacing of the appliances.

9. An electric meter service installation comprising in combination an open-sided channel-shaped integral trough of substantially uniform cross section throughout provided with spaced means for the protective association therewith of a horizontal series of electric meters, a horizontal series of circuit opening and closing meter service appliances in the trough spaced substantially in accordance with the spacing of the said meter protective means, means associated with the said trough at each side end thereof and serving either for the connection of a side end wall for closing the corresponding open side of the trough or for the connection of the trough with another similar trough or cabinet in side-by-side alignment therewith, each of the said means serving in conjunction with a side wall or with another trough or cabinet to prevent access to the interior of the trough through the corresponding initially open side thereof, and a series of manually operable handles on the exterior of the trough for actuating the respective appliances, the said handles being horizontally spaced in accordance with the spacing of the appliances.

10. An electric meter service installation comprising in combination a channel-shaped trough of substantially uniform cross section throughout adapted for enclosing a horizontal series of spaced meter service appliances, means for closing the trough at the side ends thereof, a plurality of independently openable front covers for the trough whereby access may be obtained to each enclosed appliance independently of the others, and a vertical channel member located at the adjacent edges of two adjacent covers to seal the joint between the said covers.

11. An electric meter service installation comprising in combination, a series of electric appliance receiving cabinets each including a body portion having back, top and bottom walls, the said body portion being adapted for enclosing a circuit opening and closing meter service appliance and one of the last two said walls thereof being provided with means for the protective association with the cabinet of an electric meter, and each cabinet also including an openable front cover connected with the said body portion and movable independently of the cover of any other cabinet of the series, means for connecting together in side-by-side juxtaposition each two adjacent cabinets of the series, and a vertical channel member located at the joint between each two adjacent cabinets immediately back of the adjacent edges of the corresponding covers to seal the joint between the said covers.

12. An electric meter service installation comprising in combination, a series of electric appliance receiving cabinets each including a body portion having back, top and bottom walls, the said body portion being adapted for enclosing a circuit opening and closing meter service appliance and one of the last two said walls thereof being provided with means for the protective association with the cabinet of an electric meter, and each cabinet also including an openable front cover connected with the said body portion and movable independently of the cover of any other cabinet of the series, and coupling members additional to the body portions of the cabinets for connecting each two adjacent cabinets of the series in substantially direct side-by-side engagement with each other.

13. An electric meter service installation comprising in combination, a series of electric appliance receiving cabinets each including a body portion having back, top and bottom walls, the said body portion being adapted for enclosing a circuit opening and closing meter service appliance and one of the last two said walls thereof being provided with means for the protective association with the cabinet of an electric meter, and each cabinet also including an openable front cover connected with the said body portion and movable independently of the cover of any other cabinet of the series, coupling members additional to the body portions of the cabinets for connecting each two adjacent cabinets of the series in side-by-side juxtaposition, and a vertical channel member located at the joint between each two cabinets immediately back of the adjacent edges of two corresponding covers to seal the joint between the said covers.

14. An electric meter service installation comprising in combination, a series of electric appliance receiving cabinets each including a body portion having back, top and bottom walls, the said body portion being adapted for enclosing a circuit opening and closing meter service appliance and one of the last two said walls thereof being provided with means for the protective association with the cabinet of an electric meter, and each cabinet also including an openable front cover connected with the said body portion and movable independently of the cover of any other cabinet of the series, and a removable member additional to the body portions of the cabinets serving to connect two adjacent cabinets of the series in substantially direct side-by-side engagement with each other and also serving to seal the joint between the covers of the said adjacent cabinets.

15. An electric meter service installation comprising in combination a channel-shaped trough of substantially uniform cross section throughout and open at the front from end to end to provide a continuous open-front wireway, the said trough being adapted for enclosing a horizontal series of spaced meter service appliances, means for closing the trough at the side ends thereof, a plurality of independently openable front covers for the trough whereby access may be obtained to each enclosed appliance independently of the others, and a vertical channel member located at the adjacent edges of two adjacent covers to seal the joint between the said covers, the said channel being removable to permit free access to the said wireway.

16. An electric appliance receiving cabinet comprising in combination, a body portion having a rectangular back wall with top and bottom walls joined thereto, the said body portion being adapted for enclosing a meter service appliance and one of the last two said walls thereof being provided with means for the protective association of an electric meter with the cabinet, means located at one side of the cabinet for connecting it to another similar cabinet with the respective back, top and bottom walls of the two cabinets in substantially immediate juxtaposition throughout their adjacent edges, and a rectangular front cover means connected with the body portion and normally extending substantially to the lateral edges thereof, the said cover means being openable independently of the cover means of any other connected cabinet to provide access to the enclosed appliance.

17. An electric appliance receiving cabinet comprising in combination, a body portion having a rectangular back wall with top and bottom walls joined thereto, the said body portion being adapted for enclosing a meter service appliance and one of the last two said walls thereof being provided with means for the protective association of an electric meter with the cabinet, means located at one side of the cabinet for connecting it to another similar cabinet with the respective back, top and bottom walls of the two cabinets in substantially immediate juxtaposition throughout their adjacent edges, a rectangular front cover means connected with the body portion and normally extending substantially to the lateral edges thereof, the said cover means being openable independently of the cover means of any other connected cabinet to provide access to the enclosed appliance, and a manually operable actuating handle for the enclosed appliance located on the exterior of the cabinet and between the planes of the sides thereof.

18. An open-sided cabinet of the class described comprising in combination, a body portion adapted for enclosing a meter service appliance and having a rectangular back wall with top and bottom walls joined thereto, one of the last two said walls of the body portion being provided with means for the protective association of an electric meter with the cabinet and the said body portion throughout at least a part of the distance between the said top and bottom walls being entirely open from front to rear and from side to side to form a section of an open-front wire receiving trough, means located at one side of the cabinet for connecting it either with a side wall for closing the open side or with another similar cabinet with the respective back, top and bottom walls of the two cabinets in trough-forming juxtaposition at their adjacent edges, and a rectangular front cover means connected with the body portion and normally extending substantially to the lateral edges thereof, the said cover means being openable independently of the cover means of any other connected cabinet to provide access to the enclosed appliance.

In testimony whereof I have hereunto set my hand this 9th day of May, 1927.

JOSEPH SACHS.